United States Patent [19]
Green

[11] Patent Number: 6,126,180
[45] Date of Patent: Oct. 3, 2000

[54] USER SUPPORT DEVICE

[75] Inventor: William Adam Green, Airdrie, Canada

[73] Assignee: Freedom Rider Systems, Inc., Airdrie, Canada

[21] Appl. No.: 09/111,969

[22] Filed: Jul. 8, 1998

[51] Int. Cl.$^7$ .......................... A01D 67/04; A01D 75/00; B62M 1/00

[52] U.S. Cl. ......................................... 280/32.5; 280/32.7

[58] Field of Search .................................. 280/32.5, 32.7

[56] References Cited

U.S. PATENT DOCUMENTS

| | | | |
|---|---|---|---|
| 2,317,606 | 4/1943 | Harris | 280/32.5 |
| 3,033,303 | 5/1962 | Weekly | 280/32.5 |
| 4,395,186 | 7/1983 | Whyte | 280/32.5 |
| 4,727,958 | 3/1988 | Botello | 280/32.5 |

OTHER PUBLICATIONS

Houston Chronicle, Jun. 5, 1998, p 30A Office Depot Adv. "Global Ergonomic Body Balance Chair".

*Primary Examiner*—Kenneth R. Rice
*Attorney, Agent, or Firm*—John R. Casperson

[57] ABSTRACT

A user support device which provides an alternative to a conventional chair or seat is described. The device supports the user in an inclined position. The device has a first portion for supporting a front torso area and a front thigh area of the user and a second portion for supporting a front knee area and a front shin area of the user. A frame connects the first portion and the second portion. The invention provides a method for positioning a user to operate equipment. The method is carried out by positioning the user's torso front in a torso front down, forward facing position to operate the equipment on a torso-supporting first area of a first portion of an elongated platform.

36 Claims, 4 Drawing Sheets

USER SUPPORT DEVICE

BACKGROUND OF THE INVENTION

In one aspect, this invention relates to a user support device which provides an alternative to a conventional chair or seat. In another aspect, this invention relates to a support device for an operator of equipment and the like.

Those who are experiencing moderate to severe lower back pain cannot sit in conventional chairs for extended period of time. Doing so inflicts severe back and leg pain and can result in loss of leg use for a following period.

There are no devices existing that provide the support needed for persons having lower extremity problems of this type while at the same time allowing them the opportunity to safely maneuver themselves around.

A support device that provides the needed support and can be mounted on or in equipment such as wheelchairs, electric carts, chair bases, automobiles, all-terrain vehicles, aircraft, and water craft, for example, jet skis, would be very desirable.

OBJECTS OF THE INVENTION

It is an object of this invention to provide a support device for persons who experience discomfort when using conventional seating devices.

It is another object of this invention to provide a support device which is easily accessible to persons seated in a wheelchair.

It is another object of this invention to provide a support device which can be used in the place of a conventional chair or seat in a self propelled vehicle or vessel.

SUMMARY OF THE INVENTION

In one embodiment, the invention provides a device for supporting a user in an inclined position. The device has a first portion for supporting a front torso area and a front thigh area of the user and a second portion for supporting a front knee area and a front shin area of the user. A frame connects the first portion and the second portion.

In another embodiment, the invention provides a method for positioning one's self for operating equipment. The method is carried out by positioning one's torso front in a torso front down, forward facing position to operate the equipment on a torso-supporting first area of a first portion of an elongated platform.

DETAILED DESCRIPTION OF THE INVENTION

Figure 1:
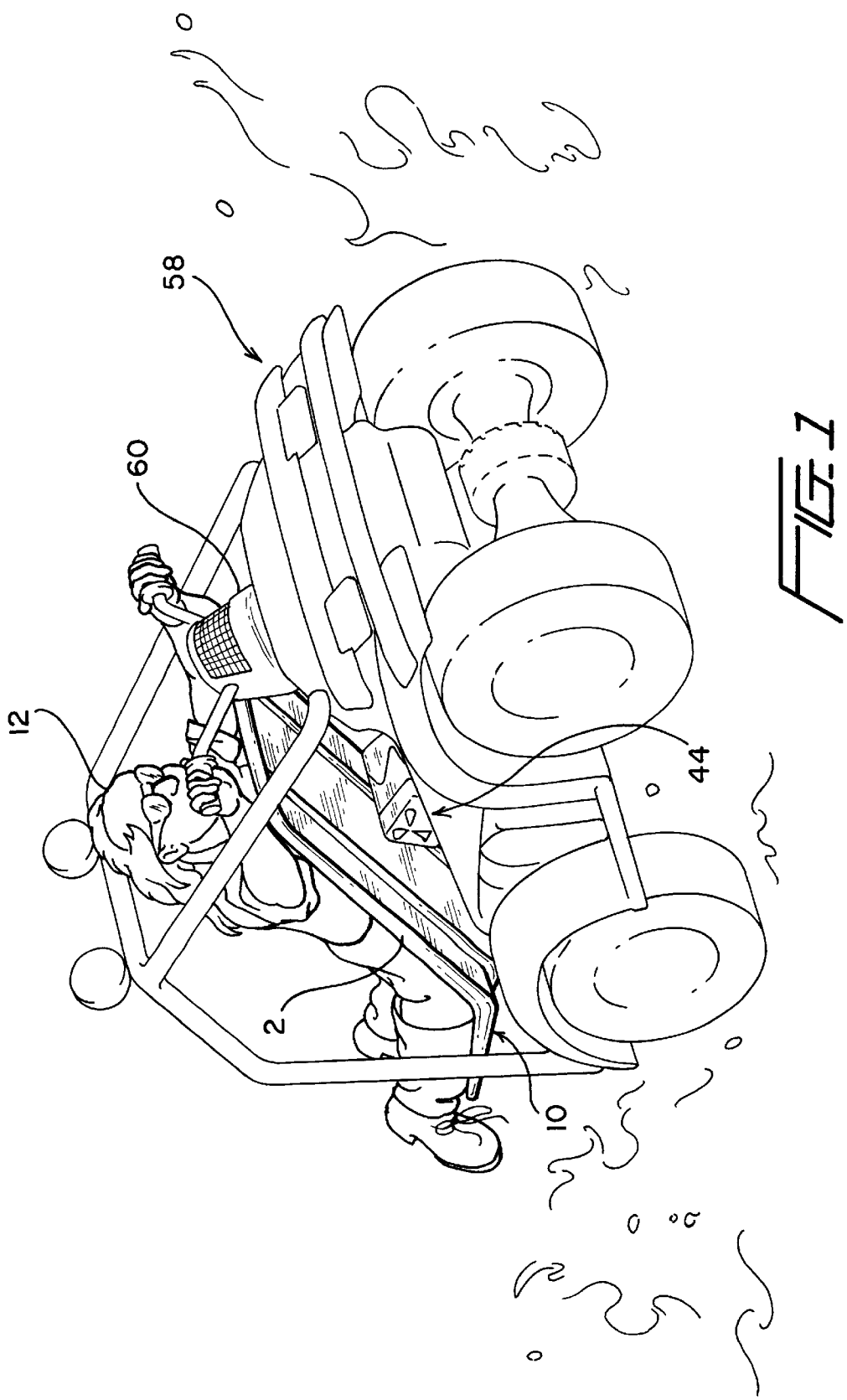
FIG. 1 pictorially illustrates a use for the present invention.
Figure 2:
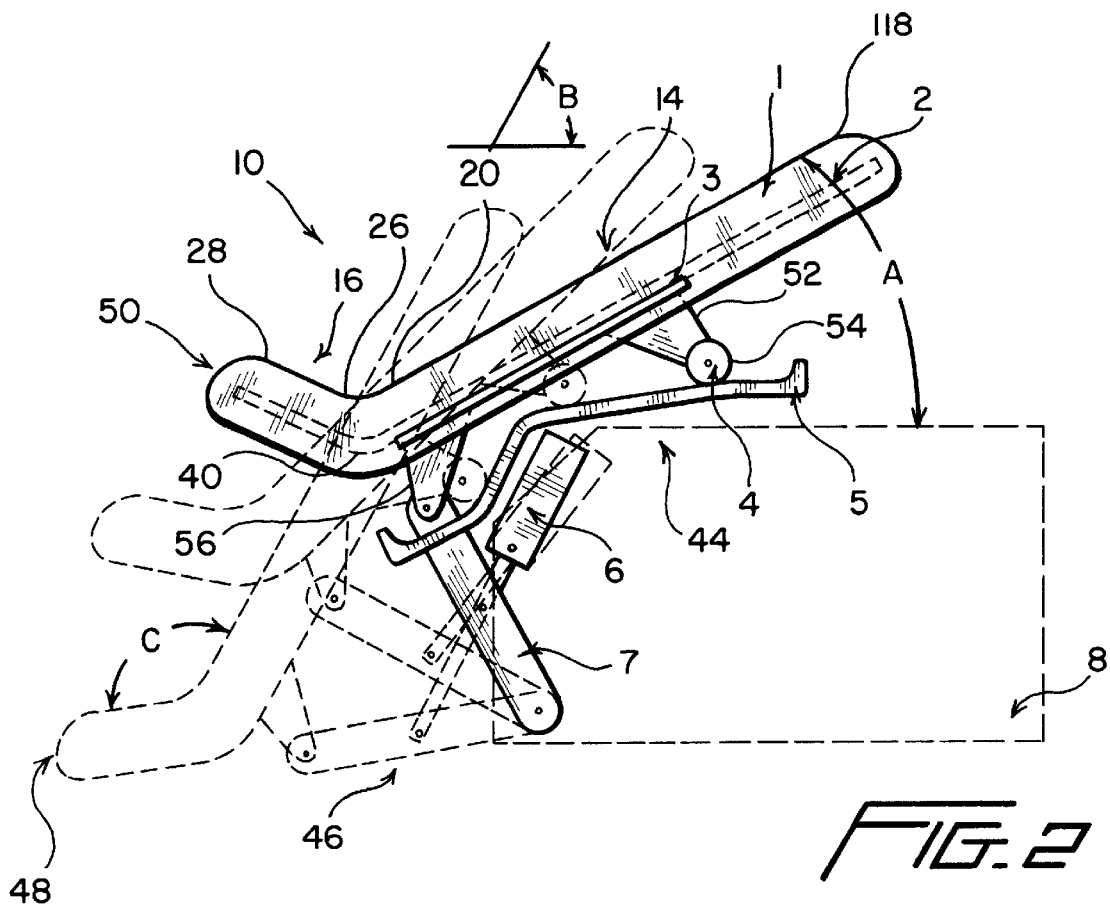
FIG. 2 is a side view of one embodiment of the invention, partly in schematic, with movement illustrated in dashed lines.

With reference to FIG. 1, in one embodiment the invention provides a device 10 for supporting a user 12 in an inclined position. With reference to FIG. 2, the device has a first portion 14 for supporting a front torso area and a front thigh area of the user and a second portion 16 for supporting a front knee area and a front shin area of the user. A frame 2 connects the first portion and the second portion.

Figure 4:
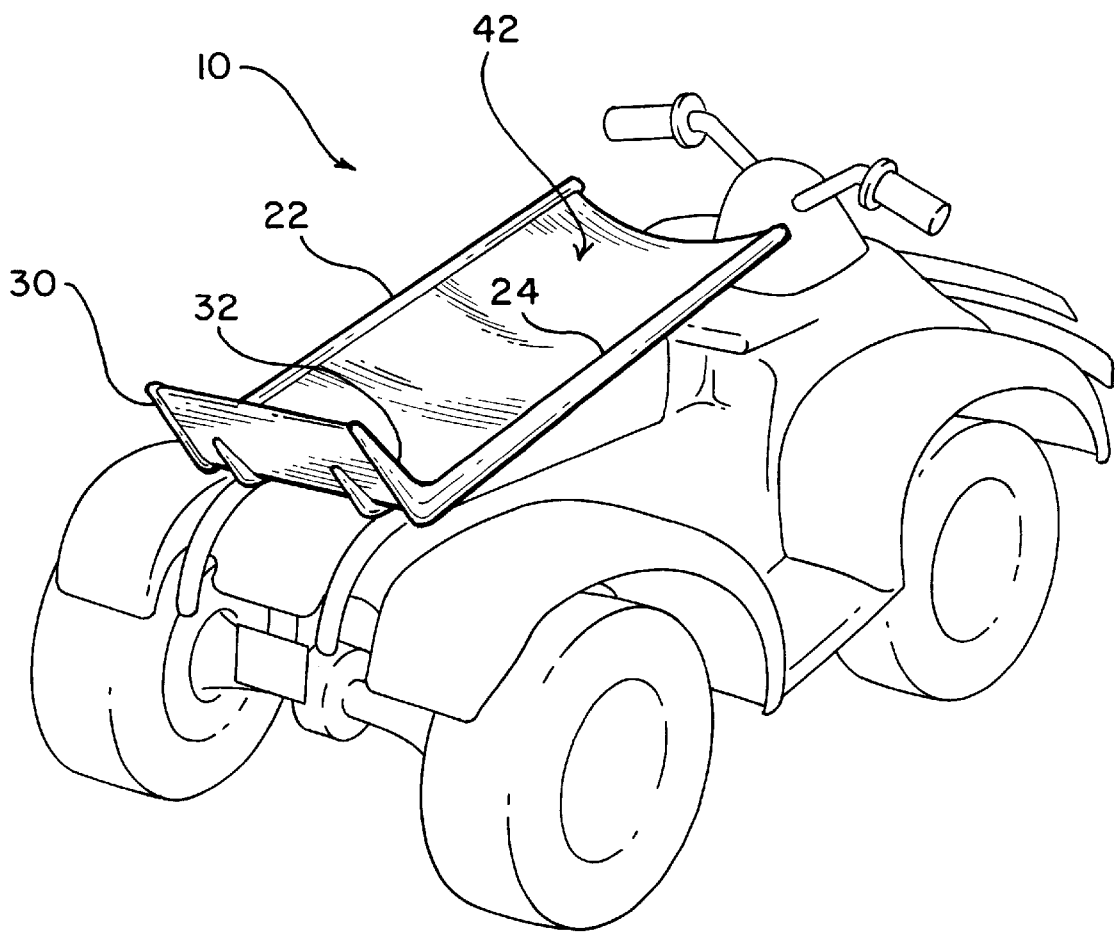
FIG. 4 pictorially illustrates the invention as shown in FIG. 1 from another angle, without the user.

Preferably, the first portion 14 has a first end 18, a second end 20, and a longitudinal axis extending between the first end and the second end. The first portion has a length as measured between the first end and the second end. As best shown by FIG. 4, the first portion has a first side 22, a second side 24 and a width as measured between the first side and the second side. The length of the first portion is greater than the width of the first portion. With reference to FIG. 2, the second portion 16 has a first end 26 and a second end 28. The second portion has a length as measured between the first end and the second end. With reference to FIG. 4, the second portion has a first side 30 and a second side 32. The second portion has width as measured between the first side and the second side. The width of the second portion is greater than the length of the second portion, and the length of the first portion is greater than the length of the second portion. With reference to FIG. 2, the frame 2 connecting the first portion and the second portion preferably positions the second portion so that the first end 26 of the second portion is general alignment with the longitudinal axis of the first portion. The frame 2 can be connected to a mounting base 3 which may be formed of heavy formed steel if desired.

With reference to FIG. 2, the frame 2 connecting the first portion and the second portion preferably positions the second portion at an angle C in the range of from about 100 to about 155 degrees from the first portion. More preferably, the angle C is in the range of from about 120 to about 140 degrees. If desired, a frame 2 can be provided which is adjustable by the user.

Figure 3:
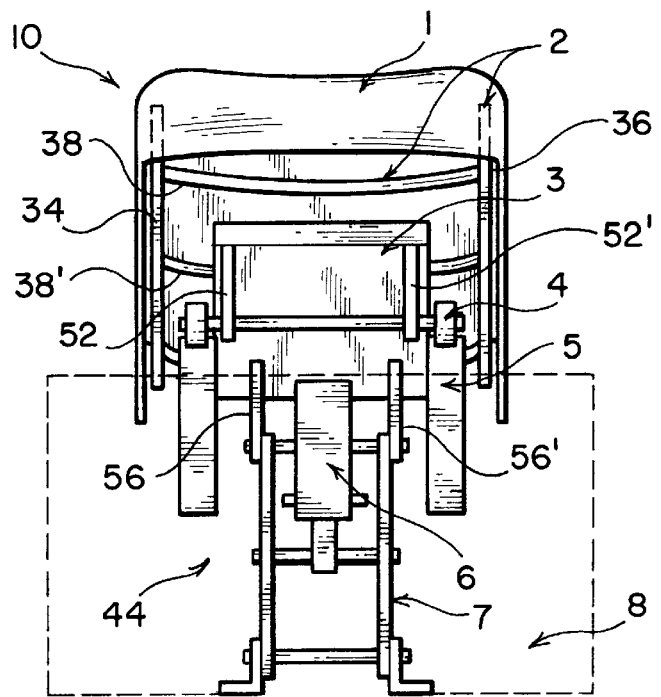
FIG. 3 is an end view of the invention as illustrated in FIG. 2.

In the embodiment illustrated by FIGS. 2 and 3, the frame 2 forms a skeletal support structure having an upper side and a lower side. The first portion 14 and the second portion 16 are formed from a cushioning material mounted to the upper side of the skeletal support structure. The second portion bends upwardly from the first portion. The first portion 14 and the second portion 16 can be formed from a variety of materials, such as high density foam, fiberglass, or a combination of other materials to provide the necessary strength and comfort. The skeletal support structure can be constructed of metal tubing.

In the embodiment illustrated in FIGS. 2 and 3, the frame 2 comprises a first longitudinal support member 34 extending along a first side of the frame, a second longitudinal support member 36 extending along a second side of the frame, and a plurality of cross support members 38, 38' connecting the first longitudinal support member with the second longitudinal support member. Each of the first longitudinal support member 34 and the second longitudinal support member 36 has a bend 40 to provide the connection between the second portion and the first portion. The bend generally corresponds to the angle C.

The length of the first portion is generally in the range of from about 2 to about 10 times the length of the second portion and is preferably in the range of from about 3 to about 5 times the length of the second portion. As a general rule, it is expected that the first portion should have a length in the range of from about 24 to about 48 inches, usually between about 30 and 40 inches. The first portion will generally have a width in the range of from about 12 to about 24 inches, usually between about 15 and about 20 inches.

With reference to FIG. 4, it is preferred that the upper surface of the first portion forms a longitudinally extending trough 42. In the illustrated device, the cross support members 38, 38' are curved so that the upper side of the first portion forms the trough. See FIG. 2.

Generally speaking, the invention will be used so that the user is inclined at an angle A which is in the range of from about 10 degrees to about 80 degrees from the horizontal, usually at an angle A which is in the range of from about 15 to about 50 degrees from the horizontal, and preferably at an angle A which is in the range of from about 17 to about 35 degrees from the horizontal. To provide the desired angle A, a mounting means 44 is connected to the frame for positioning the frame so that the first portion is positioned at the desired angle A. In FIGS. 2 and 3, a hydraulically driven mounting means 44 is shown, in FIG. 1, an electrically driven mounting means 44 is shown, and in FIG. 5, a chair base provides the mounting means 44.

Figure 5:
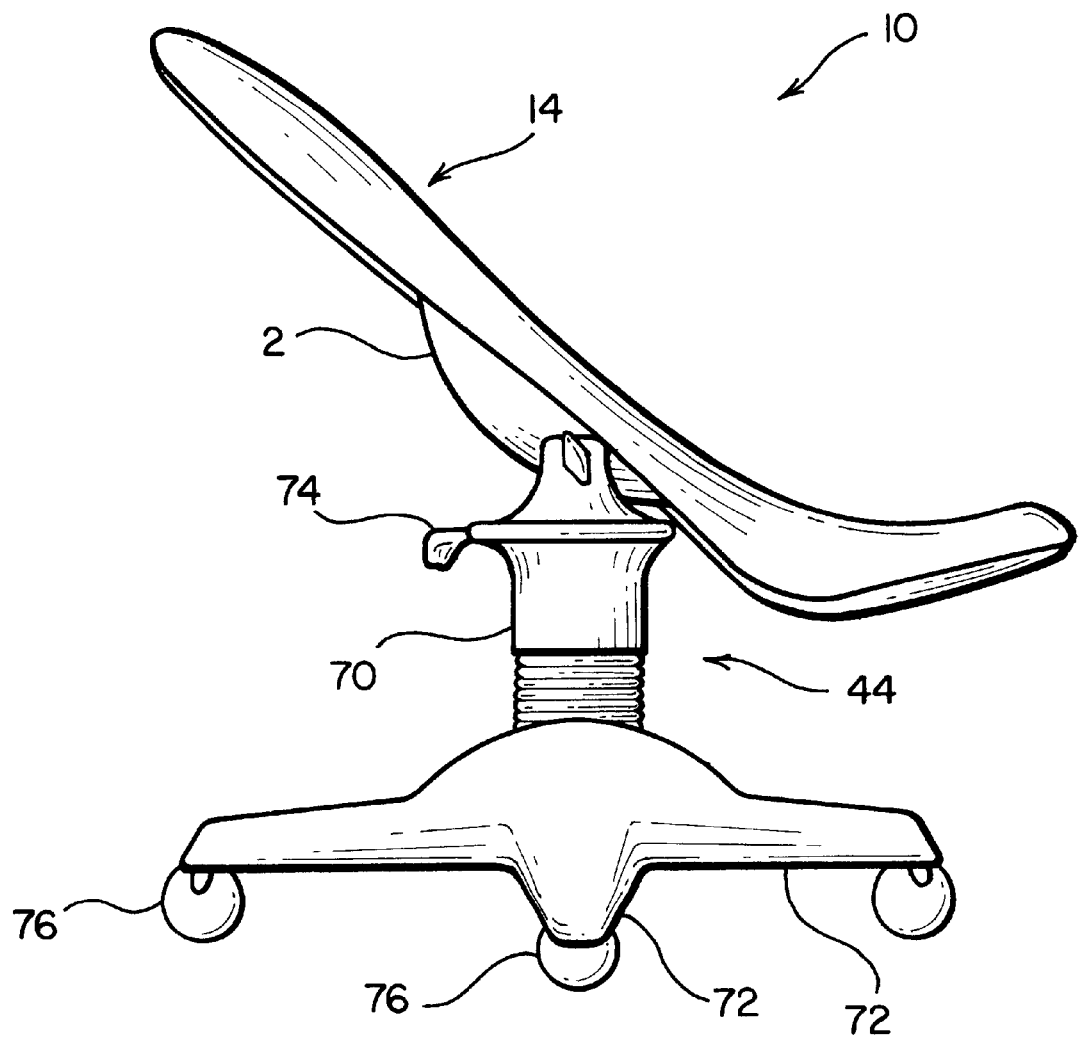
FIG. 5 pictorially illustrates another embodiment of the invention as applied to a fixed or non-self propelled device such as a chair base.

The chair base forming the mounting means 44 as shown in FIG. 5 comprises a central pedestal 70 having an upper end and a lower end and a plurality of support arms 72. The upper end of the central pedestal is attached to a portion of the frame 2 of the support device 10. The lower end of the central pedestal is attached to the inner ends of the plurality of support arms 72, with the support arms extending generally radially outwardly from the lower end of the central pedestal. Preferably, the frame 2 is pivotally attached to upper end of the central pedestal and the device is provided with a means 74 for adjusting the angle of inclination of the first portion 14 of the device from the horizontal over the previously described range. The outer end of each support arm 72 is preferably provided with a roller 76 positioned between the support arm and the supporting surface for the device to facilitate repositioning the device as needed.

The mounting means 44 shown in FIGS. 2 and 3 includes means 46 for moving the frame 2 from a first position 48 to a second position 50. The first portion 14 is positioned at the angle A when the frame is in the second position. When the frame is in the first position 48, the first portion is positioned at an angle B which generally ranges from about 55 degrees to about 75 degrees from horizontal. Angle B is generally greater than angle A. The angle at which the first portion is positioned from the horizontal thus becomes less as the first portion moves from the first position to the second position. In the embodiment illustrated in FIGS. 2 and 3, the second portion is raised as the frame moves from the first position to the second position. Generally speaking, the second portion is raised a distance in the range of from about 6 inches to about 24 inches as the frame is moved from the first position to the second position.

In the embodiment of the invention illustrated in FIGS. 2 and 3, the second end 20 of the first portion is connected to the first end 26 of the second portion. The mounting means 44 comprises a guide assembly 4 which may consist of supports securing wheels, sliders or rollers. In the illustrated embodiment, a first pair of legs 52, 52' extends from a lower side of the frame 2 from a first longitudinal position beneath a longitudinally central portion of the first portion 14. Each leg of the first pair has a first end and a second end and a roller 54, 54' attached to the second end. A second pair of legs 56, 56' extends from a lower side of the frame from a second longitudinal position near the bend 40 in the longitudinal support members. Each leg of the second pair has a first end and a second end and is pivotally attached to a driver 7. The driver 7 will generally comprise linkage 7 and an actuator 6 to provide the lift and/or tilt needed to position the first portion in the second position. The actuator 6 may be electrically driven worm, screw, hydraulic, pneumatic or mechanical, for example. The linkage 7 is for pivotally attaching the second pair of legs to the driver. An inclined track 5 supports the rollers attached to the second end of the first pair of legs. Guide rails constructed of channel, T-bar, machined bar stock, or rods or tubing may be used. A frame means 8 is provided for mounting the driver 7 and the track 5 in fixed relationship. A vehicle may serve as the frame means 8, for example or the frame can be mounted to a vehicle.

FIG. 1 shows the invention being employed in conjunction with a self propelled vehicle 58 having a steering device 60. The frame 2 of the device is connected to the self propelled vehicle so the operator 12 of the self propelled vehicle can control the steering device 60 when the torso of the operator is positioned on the first portion and knees of the operator are positioned on the second In another embodiment, the invention provides a method for positioning one's self for operating equipment. The method is carried out by positioning one's torso front in a torso front down, forward facing position to operate the equipment on a torso-supporting first area of a first portion of an elongated platform 1. The first area is preferably located adjacent to the first end 18 of the first portion 14. The first area of the platform is preferably positioned at an angle A as hereinbefore described to operate the equipment.

It is further preferred to position one's thigh fronts in a thigh front down, forward facing position to operate the equipment on a thigh-supporting second area of the first portion of the elongated platform. The second area is preferably located adjacent to the second end 20 of the first portion 14.

It is further preferred to position one's knee fronts in a knee front down position to operate the equipment on a knee supporting first area of a second portion of the elongated platform. The first area is preferably located adjacent to the first end 26 of the second portion 16.

It is further preferred to position one's shin fronts in a shin front down position to operate the equipment on a shin supporting second area of a second portion of the elongated platform. The second area is preferably located adjacent to the second end 28 of the second portion 16.

The first portion of the platform can be joined to the second portion of the platform at an angle C as hereinabove described. The equipment can comprise a self-propelled vehicle, airplane, or water crafts, in which case the method further comprises steering the equipment.

For many applications, it can be desirable to move the platform from a first position to a second position and then operate the equipment when the platform is in the second position. In such case, the first portion of the platform will often be positioned at the hereinabove described angle B when the platform is in the first position, and the platform will often be tilted to assume the angle A during the course of movement from the first position to the second position.

To facilitate use with wheelchairs, the platform can be raised during the course of movement from the first position to the second position. A user from a wheel chair would then reposition one's self from the wheelchair to the platform when the platform is in the first position. The transfer is facilitated by positioning the second portion of the platform closely adjacent to a wheelchair supporting surface when the platform is in the first position. For this application, the platform will generally be raised a distance in the range of from about 6 inches to about 30 inches from the wheelchair supporting surface when it is moved from first position to the second position. The desired movement can be carried out by moving the platform along an inclined track from the first position to the second position as hereinbefore described.

While certain preferred embodiments of the invention have been described herein, the invention is not to be construed as being so limited, except to the extent that such limitations are found in the

What is claimed is:

1. A device for supporting a user in an inclined face-down position to facilitate said user operating equipment, said device having
   a first portion for supporting a front torso area and a front thigh area of the user,
   a second portion for supporting a front knee area and a front shin area of the user,
   a frame connecting the first portion and the second portion at an angle in the range of from about 100 to about 155 degrees, and
   a mounting means connected to the frame for positioning the frame so that the first portion is positioned at an angle in the range of from about 10 degrees to about 80 degrees from horizontal.

2. A device as
for supporting a user in an inclined position, said device having
   a first portion for supporting a front torso area and a front thigh area of the user,
   a second portion for supporting a front knee area and a front shin area of the user, and
   a frame connecting the first portion and the second portion,
   wherein
   the first portion has a first end, a second end, a longitudinal axis extending between the first end and the second end, a length as measured between the first end and the second end, a first side, a second side and a width as measured between the first side and the second side, wherein the length of the first portion is greater than the width of the first portion,
   the second portion has a first end, a second end, a length as measured between the first end and the second end, a first side, a second side, and a width as measured between the first side and the second side, the width of the second portion being greater than the length of the second portion,
   wherein the length of the first portion is greater than the length of the second portion,
   and the frame connecting the first portion and the second portion positions the second portion so that the first end of the second portion is general alignment with the longitudinal axis of the first portion.

3. A device as in claim 2 wherein the frame connecting the first portion and the second portion positions the second portion at an angle in the range of from about 100 to about 155 degrees from the first portion.

4. A device as in claim 2 wherein the frame connecting the first portion and the second portion positions the second portion at an angle in the range of from about 120 to about 140 degrees from the first portion.

5. A device as in claim 2 wherein the frame forms a skeletal support structure having an upper side and a lower side and the first portion and the second portion are formed from a cushioning material mounted to the upper side of the skeletal support structure, the second portion bending upwardly from the first portion.

6. A device as in claim 5 wherein the frame comprises a first longitudinal support member extending along a first side of the frame, a second longitudinal support member extending along a second side of the frame, and a plurality of cross support members connecting the first longitudinal support member with the second longitudinal support member, said first longitudinal support member and said second longitudinal support member each having a bend to provide the connection between the second portion and the first portion at an angle in the range of about 100 to about 155 degrees, and wherein the length of the first portion is in the range of from about 2 to about 10 times the length of the second portion.

7. A device as in claim 6 wherein the length of the first portion is in the range of from about 3 to about 5 times the length of the second portion.

8. A device as in claim 6 wherein the cross support members are curved so that the upper side of the first portion forms a trough.

9. A device as in claim 2 further comprising
   a mounting means connected to the frame for positioning the frame so that the first portion is positioned at an angle in the range of from about 10 degrees to about 80 degrees from horizontal.

10. A device as in claim 9 wherein the mounting means positions the first portion at an angle in the range of from about 15 degrees to about 50 degrees from horizontal.

11. A device as in claim 9 wherein the mounting means positions the first portion at an angle in the range of from about 17 degrees to about 35 degrees from horizontal.

12. A device as in claim 9 wherein the mounting means comprises
   means for moving the frame from a first position to a second position, wherein the first portion is positioned at an angle in the range of from about 10 degrees to about 80 degrees from horizontal in the second position.

13. A device as in claim 12 wherein the first portion is positioned at an angle in the range of from about 55 degrees to about 75 degrees from horizontal when in the first position, and wherein the angle at which the first portion is positioned from the horizontal becomes less as the first portion moves from the first position to the second position.

14. A device as in claim 13 wherein the second portion is raised a distance in the range of from about 6 inches to about 24 inches as the frame is moved from the first position to the second position.

15. A device as in claim 9 wherein the second end of the first portion is connected to the first end of the second portion and the mounting means comprises
   a first pair of legs extending from a lower side of the frame from a first longitudinal position beneath a longitudinally central portion of the first portion, each leg of the first pair having a first end and a second end and a roller attached to the second end,
   a second pair of legs extending from a lower side of the frame from a second longitudinal position near the bend in the longitudinal support members, each leg of the second pair having a first end and a second end and being pivotally attached to a driver,
   an inclined track supporting the rollers attached to the second end of the first pair of legs, and
   frame means for mounting the driver and the track in fixed relationship.

16. A device as in claim 15 further comprising linkage for pivotally attaching the second pair of legs to the driver.

17. A device as in claim 2 further comprising
   a self propelled vehicle having a steering device,
   wherein the frame is connected to said self propelled vehicle so that an operator of said self propelled vehicle whose torso is positioned on the first portion and knees are positioned on the second portion can control the steering device.

18. A method for positioning one's self in a position for operating equipment, said method comprising positioning one's torso front in a torso front down, forward facing position to operate said equipment on a torso-supporting first area of a first portion of an elongated platform, said elongated platform having a first portion for supporting one's a front torso area and a front thigh area, a second portion for supporting one's front knee area and a front shin area, a frame connecting the first portion and the second portion at an angle in the range of from about 100 to about 155 degrees, and a mounting means connected to the frame for positioning the frame so that the first portion is positioned at an angle in the range of from about 10 degrees to about 80 degrees from horizontal.

19. A method as in claim 18 wherein
the first area of the platform is positioned at an angle in the range of from about 10 degrees to about 80 degrees from horizontal to operate said equipment.

20. A method as in claim 18 wherein
the first area of the platform is positioned at an angle in the range of from about 15 degrees to about 50 degrees from horizontal to operate said equipment.

21. A method as in claim 18 wherein
the first area of the platform is positioned at an angle in the range of from about 17 degrees to about 35 degrees from horizontal to operate said equipment.

22. A method as in claim 18 further comprising positioning one's thigh fronts in a thigh front down, forward facing position to operate said equipment on a thigh-supporting second area of the first portion of the elongated platform.

23. A method as in claim 18 further comprising positioning one's knee fronts in a knee front down position to operate said equipment on a knee supporting first area of a second portion of the elongated platform.

24. A method as in claim 23 further comprising positioning one's shin fronts in a shin front down position to operate said equipment on a shin supporting second area of a second portion of the elongated platform.

25. A method as in claim 24 wherein the first portion of the platform is joined to the second portion of the platform at an angle in the range of from about 100 to about 155 degrees.

26. A method as in claim 25 wherein the first portion of the platform is joined to the second portion of the platform at an angle in the range of from about 120 to about 140 degrees.

27. A method
for positioning one's self in a position for operating equipment,
wherein the equipment comprises a self-propelled vehicle or vessel and said method for positioning is for steering said equipment, said method comprising positioning one's torso front in a torso front down, forward facing position to operate said equipment on a torso-supporting first area of a first portion of an elongated platform, positioning one's knee fronts in a knee front down position to operate said equipment on a knee supporting first area of a second portion of the elongated platform, and positioning one's shin fronts in a shin front down position to operate said equipment on a shin supporting second area of a second portion of the elongated platform.

28. A method
for positioning one's self in a position for operating equipment, said method comprising positioning one's torso front in a torso front down, forward facing position to operate said equipment on a torso-supporting first area of a first portion of an elongated platform, positioning one's knee fronts in a knee front down position to operate said equipment on a knee supporting first area of a second portion of the elongated platform, positioning one's shin fronts in a shin front down position to operate said equipment on a shin supporting second area of a second portion of the elongated platform, wherein the first portion of the platform is joined to the second portion of the platform at an angle in the range of from about 100 to about 155 degrees, and moving the platform from a first position to a second position, wherein said equipment is operated when the platform is in the second position.

29. A method as in claim 28 wherein the first portion of the platform is positioned at an angle in the range of from about 55 degrees to about 75 degrees from horizontal when in the first position.

30. A method as in claim 29 further comprising tilting the platform while moving the platform from the first position to the second position.

31. A method as in claim 30 wherein the first portion of the platform is positioned at an angle in the range of from about 60 degrees to about 70 degrees from horizontal when in the first position.

32. A method as in claim 29 further comprising raising the platform while moving the platform from the first position to the second position.

33. A method as in claim 32 further comprising repositioning one's self from a wheelchair to the platform when the platform is in the first position.

34. A method as in claim 33 wherein the second portion of the platform is closely adjacent to a wheelchair supporting surface when the platform is in the first position.

35. A method as in claim 34 wherein the platform is raised a distance in the range of from about 6 inches to about 30 inches from the wheelchair supporting surface by moving the platform from the first position to the second position.

36. A method as in claim 35 further comprising moving the platform along an inclined track from the first position to the second position.

* * * * *